INVENTORS
TSUNEHARU NITTA
HIROMITSU TAKI
YOSHIHIRO MATSUO

BY *Wendwoth, Lind & Ponack*

ATTORNEYS 3,373,120
SEMICONDUCTIVE CERAMIC COMPOSITIONS WITH POSITIVE TEMPERATURE COEFFICIENT OF RESISTANCE
Tsuneharu Nitta, Osaka-fu, Hiromitsu Taki, Sakai-shi, Osaka-fu, and Yoshihiro Matsuo, Suita-shi, Osaka-fu, Japan, assignors to Matsushita Electric Industrial Co., Ltd., Osaka, Japan
Filed Dec. 2, 1965, Ser. No. 511,185
5 Claims. (Cl. 252—520)

ABSTRACT OF THE DISCLOSURE

A ceramic composition for semiconductive materials with a positive temperature coefficient of electrical resistance consists of (a) 95.5 to 99.85% by weight of barium titanate composed of 46 to 51 mole percent of barium oxide and 49 to 54 mole percent of titanium oxide and (b) 0.15 to 4.5% by weight of an additive combination of aluminum oxide and silicon oxide, the molar ratio of aluminum oxide to silicon oxide in said combination ranging from 0.1 to 1.00 to 9.0 to 1.00. From 0.1 to 30 atomic percent of barium and/or of titanium can be replaced by an equivalent amount of lead oxide or strontium oxide.

This invention relates to ceramic compositions having a positive temperature coefficient of electrical resistance (PTC).

It has been well known that barium titanate has a relative low electrical resistance at room temperature (20° to 30° C.) and that there is an abrupt rise in resistance in a range of a few degrees of temperature from a relatively constant resistance to an extremely high resistance when the barium titanate has incorporated therein a small amount of rare earth element oxide such as cerium oxide, gadolinium oxide, samarium oxide and/or yttrium oxide. Such a semiconductive barium titanate, however, has a drawback that its electrical properties vary broadly with a deviation of principal composition, an amount of additive of rare earth element oxide and persistent impurities in the material. In addition to these drawbacks, the prior materials require strict control of their preparation processes such as firing atmosphere, soaking time at the firing temperature, and cooling rate. A minor change in the composition and preparation processes results in a broad variation in the resultant electrical properties such as room temperature resistance and PTC. Therefore, a high production yield is difficult to achieve with the prior compositions.

Application of PTC material to an electronic device also requires extremely stable electrical properties with respect to humidity, time and temperature. It is necessary for stability that the fired bodies exhibit a high density and uniform grain size.

It is an object of the invention to provide semiconductive PTC ceramic compositions having no rare earth element oxides but only inexpensive common element oxides as additives.

It is another object of the invention to provide semiconductive PTC ceramic compositions characterized by a small variation in the electrical properties with a change in principal composition.

It is a further object of the invention to eliminate the necessity for strict controls of the preparation process.

It is a still further object to provide semiconductive PTC compositions having high density and uniform grain size of fired body.

More details of this invention will become apparent upon consideration of the following description taken together with accompanying drawings in which.

Figure 1:
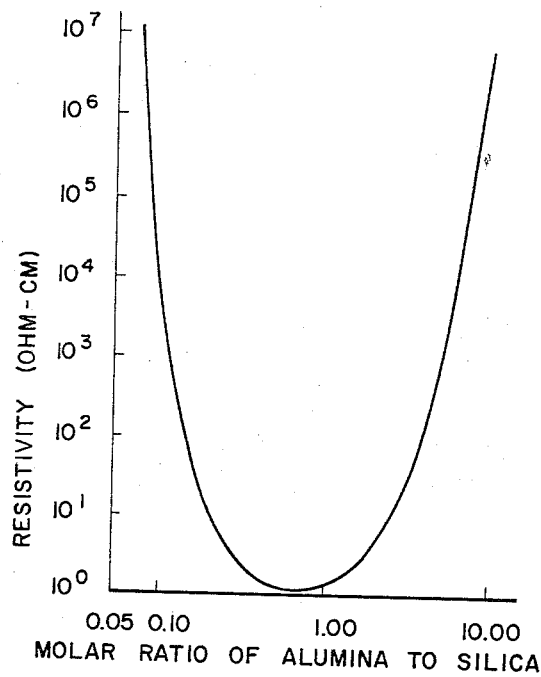
FIG. 1 is a graph illustrating effects of molar ratio of aluminum oxide to silica on the room temperature resistivity of barium titanate comprising 0.6 weight percentage of combined alumina and silica.

Referring to FIG. 1 wherein effects of molar ratio of alumina to silica are illustrated as a function of room temperature resistance of barium titanate having incorporated therein 0.6% by weight, in total amount, of an additive combination of alumina and silica in various molar ratios, and fired in air at 1380° C. for 2 hours, the electrical resistivity of the fired barium titanate is strongly reduced by an addition of combined alumina and silica. Barium titanate with low resistivity lower than $10^4$ ohm-cm. can be provided with PTC properties. An addition of only silica or alumina does not produce a semiconductive barium titanate with PTC. Operable molar ratio of alumina to silica is 0.1 to 9.0 and preferable molar ratio is 0.25 to 1.00. (Alumina is sometimes hereinafter referred to as aluminum oxide, and silica as silicon oxide.)

Desirable electrical properties of fired barium titanate, however, cannot be achieved by employing natural minerals such as kaolinite and sillimanite having the molar ratio of alumina to silica similar to that of the corresponding additive combination according to this invention. It is not certain presently why the addition of natural minerals does not produce a semiconductive PTC material. This may be attributed to persistent minor impurities of the natural minerals or to their different crystal structures from the fired barium titanate. It has been clarified according to the present invention that desirable electrical properties cannot be obtained even with fired barium titanate incorporated with a preferable weight percentage of additive combination of alumina and silica in a preferable molar ratio when the compositions comprise more than 0.1% by weight of at least one oxide selected from the group consisting of magnesium oxide and transition element oxides such as iron oxide, copper oxide, etc. It is necessary for production of semiconductive PTC barium titanate that the barium titanate doped with both alumina and silica comprises no more than 0.1% by weight of at least one oxide selected from above said poisonous oxides.

Figure 2:
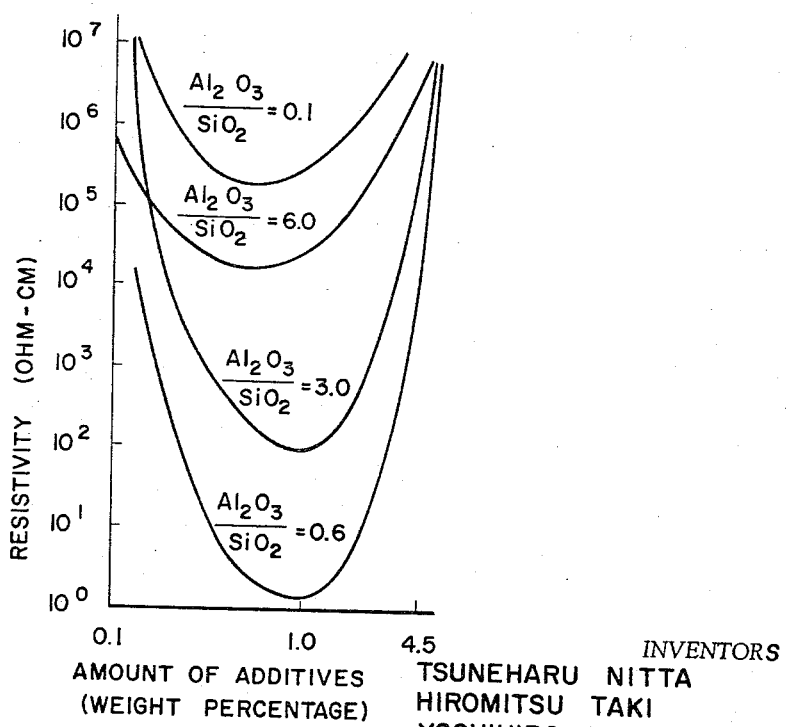
FIG. 2 is a graph illustrating effects of amounts of additive combinations in various molar ratios on the room temperature resistivity of barium titanate in accordance with this invention.

Referring to FIG. 2 wherein percentages by weight of additive combinations of alumina and silica are plotted against room temperature resistance of barium titanate fired in air at 1380° C. for 2 hours and molar ratios of alumina to silica are designated by 0.1, 0.6, 3.0 and 6.0, the amounts of said additive combination also have remarkable effects on the electrical resistance and PTC. Lower or higher percentages by weight of said additive combination do not produce a semiconductive PTC barium titanate. Operable weight percentages of the additive combination are 0.15 to 4.5% by weight and preferable weight percentages are 0.3 to 2.0% by weight.

X-ray powder diffraction analysis indicates one phase of perovskite structure of barium titanate, the additive combinations existing in a solid solution form in the barium titanate.

It is well known that the electrical resistance of pure barium titanate decreases with decrease in partial pressure of oxygen in the firing atmosphere. The pure barium titanate exhibits a resistance of 10 to 100 ohm-cm. at room temperature when fired in nitrogen containing less than $10^{-2}$ mm. Hg of partial pressure of oxygen whereas it exhibits a resistance of more than $10^8$ ohm-cm. at room temperature when fired in air. The electrical resistance of barium titanate incorporated with only silica or alumina behaves in a similar way to that of pure barium titanate while the electrical resistance of barium titanate incorporated with aforesaid weight percentages of additives combinations in the aforesaid molar ratio does not increase with an increase in the partial oxygen pressure of the firing atmosphere. Therefore, semiconductive PTC barium titanate can be produced when fired in air.

It has been well known that barium titanate doped with rare earth element oxides possesses electrical properties which vary broadly with soaking time at firing temperature and cooling rates when it is fired and cooled in air. The novel compositions of this invention, however, have very stable electrical properties with different soaking times at the firing temperature and cooling rates even when they are fired in air. Therefore, a high yield can be obtained with the novel compositions fired in air in accordance with this invention.

Another great feature of this invention is that the desirable electrical properties can be obtained by air-firing even when the principal mole percentages of the barium titanate deviate from a stoichiometric composition of 50 mole percentages of barium oxide and 50 mole percentages of titanium dioxide. Conventional barium titanate compositions comprising rare earth element oxides readily fail to become semiconductive PTC materials when the principal mole percentages deviate slightly from the stoichiometric composition. According to the present invention, the semiconductive PTC barium titanate can be obtained with the principal compositions of 46 to 51 mole percentages of barium oxide and 49 to 54 mole percentages of titanium dioxide where the principal compositions have incorporated therein the aforesaid percentages by weight of additive combinations in the aforesaid molar ratio.

In addition to the attainment of semiconductive PTC properties, the additive combination of alumina and silica can produce a fired body having a higher density and more uniform grain size than a fired body without the combined additives. The higher density and more uniform grain size are preferable for obtaining more stable electrical properties with operating time and temperature.

An addition of additive combinations of the invention does not extensively change the temperature at which the electrical resistance abruptly rises in a few degrees of temperature in connection with its Curie temperature. The temperature can be shifted broadly by partial replacements of the principal ingredients of barium or titanium by lead and strontium or zirconium and tin without any deterioration of the desirable electrical properties in accordance with this invention. A partial substitution of lead for barium can elevate the temperature to 180° C. from 120° C. Operable percentages of substitution of lead for barium are 0.1 to 30 atom percentages. The temperature can be lowered from 120° C. to 20° C. by a partial substitution of strontium for barium in an amount of 0.1 to 30 atom percentages. The barium titanate having the additive combinations of the invention incorporated therein can exhibit the temperature ranging from 120° C. to 50° C. by substitution of tin for titanium in an amount of 0.1 to 30 atom percentages. The temperature also can be lowered from 120° C. to 60° C. by a partial substitution of zirconium for titanium in an amount of 0.1 to 30 atom percentages.

In preparing the semiconductive materials of the present invention, the titanium oxide is employed as anatase. The barium oxide can be introduced as barium carbonate. The strontium oxide and the lead oxide can be added to the barium carbonate. The zirconium oxide and the tin oxide can be added to the titanium oxide. The aluminum oxide and the silicon oxide are introduced as oxides, respectively. Desired compositions comprising titanium oxide, barium oxide, aluminum oxide and silicon oxide, for example, are wet mixed in a rubber lined pot mill using agate pebbles. Ball milling times of 10 to 24 hours give an intimate homogeneous mixture. The resultant mixture is dried, for example, by heating at 100° C. The resultant powder is admixed with an emulsion of polyvinyl alcohol in a proportion of 100 grams of the powder to 8 cc. of a 6 percent aqueous emulsion of polyvinyl alcohol. The organic binder enables the powder to be compacted, in a pellet forming machine, into a pellet of a size and shape desired. Good results have been obtained when pressures of from 750 to 1000 kg./cm.$^2$ are applied to the powder. The pressed bodies are then sintered in air at a temperature to densify the body of pellets. Sintering temperatures of about 1200° to 1400° C. are sufficient. It will be understood that at the lower temperatures longer times will be required: usually sintering for an hour or two is adequate. These materials are then treated to provide ohmic contacts at spaced portions thereof in order to determine the above-mentioned semiconductive characteristics. A coating method employing an electrode material, for example, indium gallium alloy, is satisfactory. Electrical resistance may be measured in a per se conventional method by using a Wheatstone's bridge.

The following examples of presently preferred embodiments illustrate the specified novel compositions of this invention but are not intended to be construed as limitative.

*Example 1*

The following compositions are mixed, pressed and air-fired at 1380° C. for 2 hours in the manner hereinbefore described.

TABLE I

| Sample No. | Principal Composition (mole percent) | | Molar Ratio of Al$_2$O$_3$ to SiO$_2$ | Weight Barium Titanate | Percentages Additives |
|---|---|---|---|---|---|
| | BaO | TiO$_2$ | | | |
| 1 | 51 | 49 | 0.5 | 99.8 | 0.2 |
| 2 | 50 | 50 | 0.5 | 99.4 | 0.6 |
| 3 | 48 | 48 | 0.5 | 98.0 | 2.0 |
| 4 | 46 | 54 | 0.5 | 97.0 | 3.0 |

Figure 3:
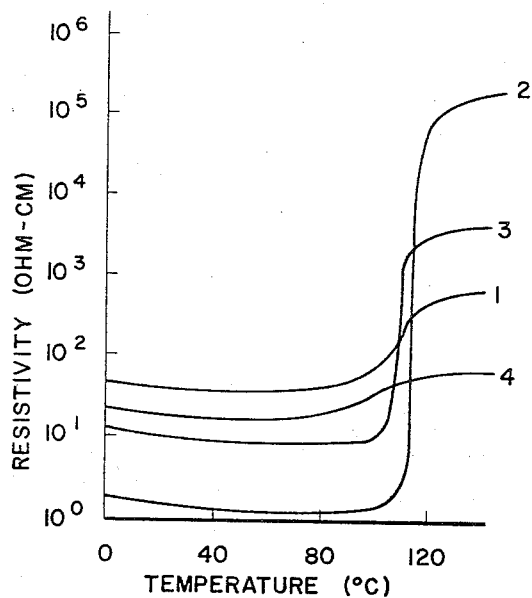
FIG. 3 is a graph plotting resistance against temperature of barium titanate having additive combinations in accordance with this invention.

The temperature dependence of the electrical resistance is graphically illustrated in FIG. 3. The abrupt rise in electrical resistance is readily controlled by changing the weight percentages of the additive combinations.

*Example 2*

The following compositions are mixed, pressed and air-fired as aforedescribed. Sample 5 is air-fired at 1250° C. for 2 hours and samples 6, 7 and 8 are air-fired at 1380° C. for 2 hours.

TABLE II

| Sample No. | Principal Composition | Molar Ratio of Al$_2$O$_3$ to SiO$_2$ | Weight Barium Titanate | Percentages Additives |
|---|---|---|---|---|
| 5 | Ba$_{0.8}$Pb$_{0.2}$TiO$_3$ | 0.5 | 99.4 | 0.6 |
| 6 | Ba$_{0.70}$Sr$_{0.30}$TiO$_3$ | 0.5 | 99.4 | 0.6 |
| 7 | BaTi$_{0.95}$Sn$_{0.05}$O$_3$ | 0.5 | 99.4 | 0.6 |
| 8 | BaTi$_{0.85}$Zr$_{0.15}$O$_3$ | 0.5 | 99.4 | 0.6 |

Figure 4:
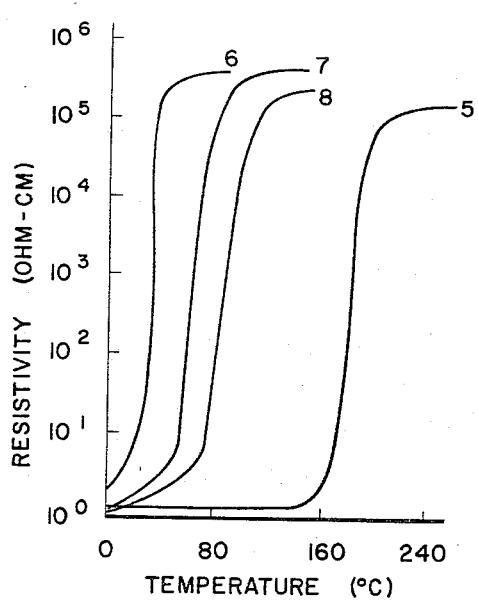
FIG. 4 is a graph illustrating effects of partial replacement of principal ingredients on the electrical properties.

The temperature dependence of the electrical resistance is illustrated graphically in FIG. 4. A temperature characterized by an abrupt rise in resistance is readily changed by a partial substitution (replacement) of principal ingredients in accordance with the present invention.

What is claimed is:

1. A ceramic composition for semiconductive materials with a positive temperature coefficient of electrical resistance, consisting essentially of (a) 95.5 to 99.85% by weight of barium titanate composed of 46 to 51 mole percent of barium oxide and 49 to 54 mole percent of titanium oxide and (b) 0.15 to 4.5% by weight of an additive combination of aluminum oxide and silicon oxide, the molar ratio of aluminum oxide to silicon oxide in said combination ranging from 0.1 to 1.00 to 9.0 to 1.00, the content in said ceramic composition of oxide selected from the group consisting of magnesium oxide and transition element oxides being no more than 0.1% by weight.

2. A ceramic composition according to claim 1, wherein the molar ratio of aluminum oxide to silicon oxide in said combination is 0.25 to 1.00.

3. A ceramic composition according to claim 1, wherein the quantity of barium titanate (a) is from 98.0 to 99.7% by weight, and the quantity of additive combination of aluminum oxide and silicon oxide is from 0.3 to 2.0% by weight.

4. A ceramic composition for semiconductive materials with a positive temperature coefficient of electrical resistance according to claim 2, wherein 0.1 to 30 atomic percent of barium is replaced by an equivalent amount of oxide selected from the group consisting of lead oxide and strontium oxide.

5. A ceramic composition for semiconductive materials with a positive temperature coefficient of electrical resistance according to claim 2, wherein 0.1 to 30 atomic percent of titanium is replaced by an equivalent amount of oxide selected from the group consisting of tin oxide and zirconium oxide.

References Cited
FOREIGN PATENTS 714,965   9/1954   Great Britain.

LEON D. ROSDOL, *Primary Examiner.*

J. D. WELSH, *Assistant Examiner.*